(12) United States Patent
Tang

(10) Patent No.: US 11,184,939 B2
(45) Date of Patent: Nov. 23, 2021

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 4 days.

(21) Appl. No.: 16/620,746

(22) PCT Filed: Jul. 28, 2017

(86) PCT No.: PCT/CN2017/094912
§ 371 (c)(1),
(2) Date: Dec. 9, 2019

(87) PCT Pub. No.: WO2019/019150
PCT Pub. Date: Jan. 31, 2019

(65) Prior Publication Data
US 2020/0128605 A1    Apr. 23, 2020

(51) Int. Cl.
*H04W 76/20*     (2018.01)
*H04W 80/02*     (2009.01)

(52) U.S. Cl.
CPC ............ *H04W 76/20* (2018.02); *H04W 80/02* (2013.01)

(58) Field of Classification Search
CPC ... H04L 1/189; H04L 1/08; H04L 1/18; H04L 1/22; H04L 5/001; H04L 12/761; H04W 12/02; H04W 80/02; H04W 76/20; H04W 28/06; H04W 72/04; H04W 76/15; H04W 28/02; H04W 80/08; H04W 28/04; H04W 76/28; H04W 72/042; H04W 28/0205; H04W 76/25
USPC ........................................................ 370/329
See application file for complete search history.

(56) References Cited

U.S. PATENT DOCUMENTS

| | | | | |
|---|---|---|---|---|
| 8,605,674 | B2 * | 12/2013 | Park ........................... | H04L 1/08 370/329 |
| 10,405,231 | B2 * | 9/2019 | Lohr ...................... | H04W 76/27 |
| 10,455,551 | B2 * | 10/2019 | Jang .................. | H04W 72/0406 |
| 10,536,878 | B2 * | 1/2020 | Jheng .................... | H04W 76/28 |

(Continued)

FOREIGN PATENT DOCUMENTS

| | | |
|---|---|---|
| CN | 103201977 | 7/2013 |
| CN | 105873038 | 8/2016 |

(Continued)

OTHER PUBLICATIONS

Samsung, "Considerations on Packet Duplication for URLLC," 3GPP TSG-RAN WG2 Meeting #97, R2-1701986, Feb. 2017, 4 pages.

(Continued)

*Primary Examiner* — Man U Phan
(74) *Attorney, Agent, or Firm* — Hodgson Russ LLP

(57) ABSTRACT

A data transmission method includes: when a data duplication function of a packet data convergence protocol (PDCP) layer is switched from an activated state to a closed state, determining a first entity of a protocol data unit (PDU) for transmitting the PDCP layer; and sending the PDU to a network device via the first entity.

10 Claims, 2 Drawing Sheets

100

When a data duplication function of a PDCP layer is switched from an activated state to a closed state, determine a first entity of a PDU for transmitting the PDCP layer — 110

Send the PDU to a network device via the first entity — 120

(56) References Cited

U.S. PATENT DOCUMENTS

| | | | |
|---|---|---|---|
| 10,574,564 B2 * | 2/2020 | Loehr | H04W 76/15 |
| 10,582,418 B2 * | 3/2020 | Tsai | H04L 69/321 |
| 10,659,992 B2 * | 5/2020 | Lohr | H04W 28/065 |
| 10,805,836 B2 * | 10/2020 | Yu | H04L 5/0053 |
| 10,834,720 B2 * | 11/2020 | Tang | H04W 28/0205 |
| 10,869,223 B2 * | 12/2020 | Kim | H04L 1/08 |
| 10,917,816 B2 * | 2/2021 | Kim | H04L 1/08 |
| 2012/0057560 A1 | 3/2012 | Park et al. | |
| 2020/0128599 A1 * | 4/2020 | Tang | H04W 72/1289 |
| 2020/0213219 A1 * | 7/2020 | Tang | H04L 45/16 |
| 2020/0228438 A1 * | 7/2020 | Loehr | H04W 28/04 |
| 2020/0229269 A1 * | 7/2020 | Yang | H04W 28/0278 |
| 2020/0351713 A1 * | 11/2020 | Lohr | H04W 76/19 |
| 2020/0389877 A1 * | 12/2020 | Tang | H04L 1/08 |

FOREIGN PATENT DOCUMENTS

| | | |
|---|---|---|
| JP | 2020523898 | 8/2020 |
| RU | 2610250 C2 | 2/2017 |
| WO | 2009045945 | 4/2009 |

OTHER PUBLICATIONS

WIPO, ISR for PCT/CN2017/094912, dated Apr. 20, 2018.
ZTE, "Consideration of the activation/deactivation of data duplication for CA", 3GPP TSG-RAN WG2 meeting #98, R2-1704660, 3 pages, May 15, 2017, China.
RUPTO, First Office Action and search report for RU2019144037, dated Oct. 27, 2020.
Asustek, "Activation and Deactivation of UL PDCP duplication," 3GPP TSG-RAN WG2 Meeting NR Ad-hoc #2, R2-1706945 (Revision of R2-1705416), Jun. 2017, 5 pages.
Huawei et al., "Interaction between PDCP/RLC/MAC for packet duplication," 3GPP TSG RAN WG2 Meeting #98, R2-1704836, May 2017, 3 pages.
Sharp, "Enable/Disable PDCP Duplication," 3GPP TSG-RAN2 Meeting #98, R2-1704941, May 2017, 2 pages.
ZTE, "Consideration on the LCP for data duplication," 3GPP TSG-RAN WG2 Meeting #98, R2-1704666, May 2017, 5 pages.
EPO, Office Action for EP Application No. 17918872.7, dated Apr. 29, 2020.
CIPO, Office Action for CA Application No. 3067074, dated Mar. 18, 2021.
IPI, Office Action for IN Application No. 201917054487, dated Mar. 31, 2021.
EPO, Communication for EP Application No. 17918872.7, dated May 20, 2021.
JPO, Office Action for JP Application No. 2019-568083, dated May 21, 2021.
IPI, Hearing Notice for IN Application No. 201917054487, dated Sep. 2, 2021.
IPOS, Office Action for SG Application No. 11201913348R, dated Aug. 12, 2021.

* cited by examiner

DATA TRANSMISSION METHOD, TERMINAL DEVICE AND NETWORK DEVICE

CROSS-REFERENCE TO RELATED APPLICATION

This application is a U.S. national phase application of International Application No. PCT/CN2017/094912, filed Jul. 28, 2017, the entire disclosure of which is incorporated herein by reference.

TECHNICAL FIELD

Embodiments of the present disclosure relate to the field of communication, and more particularly, to a data transmission method, a terminal device, and a network device.

BACKGROUND

Belonging to a data link layer, the packet data convergence protocol (PDCP) layer is used for processing radio resource control (RRC) messages on a control plane and Internet Protocol (IP) packets on a user plane. On the user plane, after a PDCP sublayer obtains an IP data packet from an upper layer, the IP data packet may be subject to header compression and encryption, and then the processed IP data packet is submitted to a radio link control (RLC) sublayer.

In the related art, when a data duplication function of the PDCP layer is in an activated state, a data size of each RLC entity is the same since data are duplicated. A large amount of signaling overhead may be caused if a buffer status report (BSR) is reported for a logical channel corresponding to each RLC entity.

To solve the above problem, the concept of logical channel group (LCG) is introduced into the long term evolution (LTE) technology. Specifically, supposing the data duplication function of the PDCP is in the activated state, a network device maps a first RLC entity onto a certain LCG (that is, a logical channel corresponding to the first RLC entity is placed onto this LCG), but does not map a second RLC entity onto a certain LCG (that is, a logical channel corresponding to the second RLC entity is not placed onto this LCG). That is, the first RLC entity is included in the BSR, whereas the second RLC entity is not included in the BSR.

However, in the foregoing technical solution, when the data duplication function of the PDCP layer is disabled, a terminal device may disable the first RLC entity, which may cause that the network cannot obtain the BSR including the first RLC entity, such that the success rate of data transmission is reduced.

SUMMARY

A data transmission method, a terminal device and a network device are provided, which can effectively improve the success rate of data transmission.

In a first aspect, a data transmission method is provided, and the method includes:

determining, when a data duplication function of a packet data convergence protocol (PDCP) layer is switched from an activated state to an inactivated state, a first entity used for transmitting a protocol data unit (PDU) of the PDCP layer; and sending the PDU to a network device via the first entity.

In some embodiments of the present disclosure, the terminal device can determine an RLC entity (an RLC entity mapped to an LCG or an RLC entity needing to be mapped to an LCG) of a PDU for transmitting a PDCP layer when a data duplication function of the PDCP layer is switched from an activated state to an inactivated state, and then transmit the PDU of the PDCP layer on the RLC entity mapped onto the LCG, such that the success rate of data transmission can be effectively improved.

In some possible implementation manners, the determining a first entity used for transmitting a protocol data unit (PDU) of the PDCP layer includes:

acquiring at least one second entity, the at least one second entity being a radio link control (RLC) entity corresponding to the PDU when the data duplication function is in the activated state; and determining the first entity in the at least one second entity.

In some possible implementation manners, the determining the first entity in the at least one second entity includes:

determining, in the at least one second entity, the RLC entity mapped onto a logical channel group (LCG) as the first entity.

In some embodiments of the present disclosure, the terminal device can determine an RLC entity mapped onto an LCG when the data duplication function of the PDCP layer is switched from the activated state to the inactivated state, and can transmit the PDU of the PDCP layer on the RLC entity mapped onto the LCG, such that the success rate of data transmission can be effectively improved.

In some possible implementation manners, the determining the first entity in the at least one second entity includes:

determining the first entity according to a first order, wherein the first order is an arrangement order of the at least one second entity.

In some embodiments of the present disclosure, the terminal device can determine an RLC entity mapped onto an LCG when the data duplication function of the PDCP layer is switched from the activated state to the inactivated state, and can transmit the PDU of the PDCP layer on the RLC entity mapped onto the LCG after the network device finishes the mapping operation, such that the success rate of data transmission can be effectively improved.

In some possible implementation manners, the first order is a sequence formed by sorting the at least one second entity from high to low according to a priority of a logical channel corresponding to the RLC entity.

In some possible implementation manners, the determining a first entity used for transmitting a protocol data unit (PDU) of the PDCP layer includes:

determining the first entity according to indication information sent by the network device, the indication information being used for indicating the first entity.

In some possible implementation manners, before the determining the first entity according to indication information sent by the network device, the method further includes:

receiving the indication information sent by the network device.

In some possible implementation manners, the receiving the indication information sent by the network device includes:

receiving a radio resource control (RRC) signaling sent by the network device, the RRC signaling including the indication information.

A second aspect provides a data transmission method, which includes:

generating indication information, the indication information being used for indicating a terminal device to send, when a data duplication function of a packet data convergence protocol (PDCP) layer is switched from an activated state to an inactivated state, a protocol data unit (PDU) of the PDCP layer to a network device via a first entity; and sending the indication information to the terminal device.

In some possible implementation manners, the sending the indication information to the network device includes:

sending a radio resource control (RRC) signaling to the terminal device, the RRC signaling including the indication information.

A third aspect provides a terminal device, which includes:

a determining unit, configured to determine, when a data duplication function of a packet data convergence protocol (PDCP) layer is switched from an activated state to an inactivated state, a first entity used for transmitting a protocol data unit (PDU) of the PDCP layer; and a transceiving unit, configured to send the PDU to a network device via the first entity.

A fourth aspect provides a terminal device, which includes:

a processor, configured to determine, when a data duplication function of a packet data convergence protocol (PDCP) layer is switched from an activated state to an inactivated state, a first entity used for transmitting a protocol data unit (PDU) of the PDCP layer; and a transceiver, configured to send the PDU to a network device via the first entity.

A fifth aspect provides a network device, which includes:

a generating unit, configured to generate indication information, the indication information being used for indicating a terminal device to send, when a data duplication function of a packet data convergence protocol (PDCP) layer is switched from an activated state to an inactivated state, a protocol data unit (PDU) of the PDCP layer to the network device via a first entity; and a sending unit, configured to send the indication information to the terminal device.

A sixth aspect provides a network device, which includes:

a processor, configured to generate indication information, the indication information being used for indicating a terminal device to send, when a data duplication function of a packet data convergence protocol (PDCP) layer is switched from an activated state to an inactivated state, a protocol data unit (PDU) of the PDCP layer to a network device via a first entity; and a transceiver, configured to send the indication information to the terminal device.

A seventh aspect provides a computer-readable medium configured to store a computer program including instructions for performing the method according to the first aspect or the second aspect.

An eighth aspect provides a computer chip, which includes: an input interface, an output interface, at least one processor, and a memory. The processor is configured to execute a code in the memory. When the code is executed, the processor may implement each process executed by the terminal device or the network device in the data transmission method according to the first aspect or the second aspect.

A ninth aspect provides a communication system, which includes the foregoing network device and the foregoing terminal device.

DETAILED DESCRIPTION

Technical solutions in the embodiments of the present disclosure will be described below with reference to the accompanying drawings.

It is to be understood that the technical solutions in the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a 5G communication system, a Long Term Evolution (LTE) system, an LTE Frequency Division Duplex (FDD) system, an LTE Time Division Duplex (TDD) system, and a Universal Mobile Telecommunication System (UMTS), etc.

The embodiments of the present disclosure are described with reference to a network device and a terminal device.

The network device may be a base station or a network side device having a base station function. For example, the network device may be a Base Transceiver Station (BTS) in a GSM system or a CDMA system, a NodeB (NB) in a WCDMA system, an Evolutional Node B (eNB or eNodeB) in an LTE system, or a wireless controller in Cloud Radio Access Network (CRAN), or a relay station, an access point, a vehicle-mounted device, a wearable device, and a network device in a future 5G network, etc.

The terminal device may also be referred to as an access terminal, user equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a SIP (Session Initiation Protocol) phone, a WLL (Wireless Local Loop) station, a PDA (Personal Digital Assistant), a handheld device having a wireless communication function, a computing device, or another linear processing device connected to a wireless modem, a vehicle-mounted device, and a wearable device, etc.

Based on New Radio (NR) technologies, in the Carrier Aggregation (CA) scenario, an embodiment of the present disclosure provides a data transmission method, which may utilize a data duplication function of a packet data convergence protocol (PDCP) layer to implement data duplication transmission. The data transmission method provided by the embodiment of the present disclosure can effectively improve the reliability of data transmission.

The method for transmitting duplicated data in the CA scenario in the embodiment of the present disclosure will be briefly introduced below with reference to FIG. 1.

Figure 1:
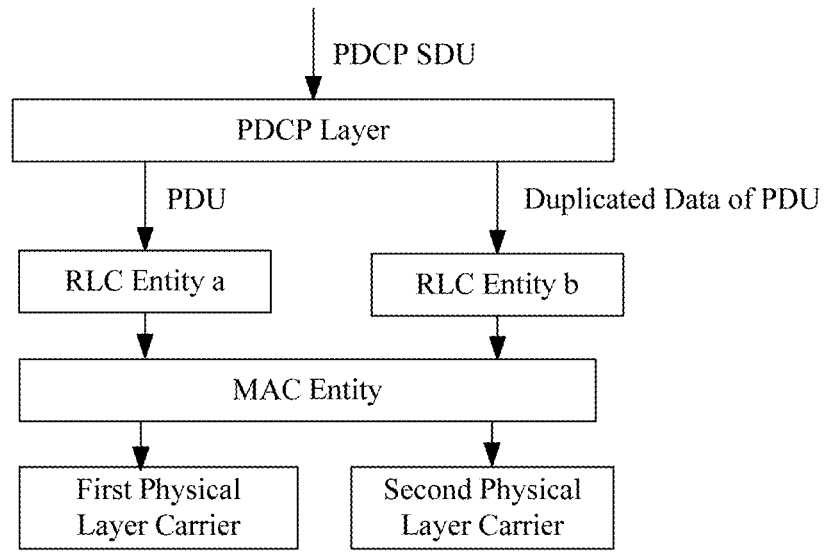
FIG. 1 is a schematic flowchart of a data transmission method of a PDCP layer according to an embodiment of the present disclosure.

FIG. 1 is a schematic flowchart of a data transmission method of a PDCP layer according to an embodiment of the present disclosure.

As shown in FIG. 1, data (PDU and duplicated data of the PDU) generated by the PDCP layer are respectively transmitted to two different RLC entities (RLC entity a and RLC entity b), wherein the two different RLC entities are mapped to different physical layer carriers (first physical layer carrier and second physical layer carrier) through the same media access control (MAC) layer entity (MAC entity). It is to be understood that in the embodiments of the present disclosure, the data (the PDU and the duplicated data of the PDU) generated by the PDCP layer are respectively mapped to different physical layer carriers through two different RLC entities. In this way, the objective of frequency diversity gain can be achieved, and thus the reliability of data transmission can be improved.

Specifically, each sub-layer may send different data of the PDU to designated layers of a receiving terminal. Data not processed in each sub-layer are referred to as service data unit (SDU), and data processed by the sub-layer and formed into a specific format are referred to as protocol data unit (PDU). That is, the SDU is an information unit transmitted from a higher-level protocol to a lower-level protocol, i.e., the original data of the SDU is the PDU of an upper-layer protocol. In other words, the PDU formed in this layer is the SDU of the next layer.

For example, each logical channel of each terminal device has one RLC entity, and data received by the RLC entity from the PDCP layer or data sent by the RLC entity to the PDCP layer may be referred to as RLC SDU (or PDCP PDU). Data received by the RLC entity from an MAC layer or data sent by the RLC entity to the MAC layer may be referred to as RLC PDU (or MAC SDU).

It is to be understood that in the embodiments of the present disclosure, the RLC layer is positioned between the PDCP layer and the MAC layer, and the RLC layer may communicate with the PDCP layer through a service access point (SAP), and communicate with the MAC layer through a logical channel. However, the embodiments of the present disclosure are not limited thereto.

In the embodiments of the present disclosure, when the data duplication function of the PDCP layer is in an activated state, the PDU of the PDCP layer (i.e., PDCP PDU) and duplicated data of the PDCP PDU are mapped to different physical layer carriers through different RLC entities, which can effectively improve the reliability of data transmission.

However, the data size of the PDCP PDU is the same as that of the duplicated data of the PDCP PDU, thus the terminal device only needs to map an RLC entity corresponding to the PDCP PDU or an RLC entity corresponding to the duplicated data of the PDCP PDU to a certain LCG. That is, only one RLC entity is thus included in the buffer status report (BSR).

Therefore, when the data duplication function of the PDCP layer is disabled, to ensure the network to continue obtaining the BSR of the selected RLC entity, an RLC entity mapped onto a certain LCG should be selected to transmit the PDU of the PDCP layer, rather an RLC entity not mapped onto a certain LCG should not be selected to transmit the PDCP PDU. That is, if the terminal device transmits the PDCP PDU with an RLC entity that is not mapped onto a certain LCG, this may cause failure of data transmission, thereby reducing the success rate of data transmission. Referring to FIG. 1, it is assumed that when the data duplication function of the PDCP layer is in the activated state, the network device maps an RLC entity a onto a certain LCG, but does not map an RLC entity b onto the LCG. If the terminal device selects to transmit the PDCP PDU with the RLC entity b, this may likely cause failure of data transmission.

Therefore, an embodiment of the present disclosure further provides a data transmission method, which mainly aims at how to determine, by the terminal device, the RLC entity which is mapped to the LCG and is used for transmitting the PDU of the PDCP layer when the data duplication function of the PDCP layer is switched from the activated state to the inactivated state in the CA scenario, so as to improve the success rate of data transmission.

Figure 2:
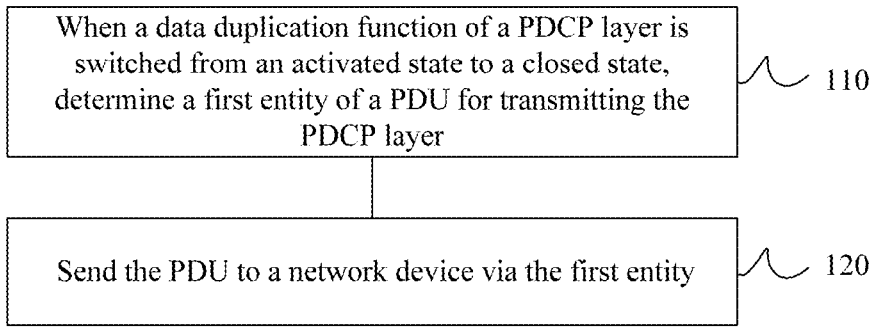
FIG. 2 is a schematic flowchart of a data transmission method according to an embodiment of the present disclosure.

FIG. 2 is a schematic flowchart of a data transmission method 100 according to an embodiment of the present disclosure.

As shown in FIG. 2, the method 100 includes following steps:

S110: determining, when a data duplication function of a packet data convergence protocol (PDCP) layer is switched from an activated state to an inactivated state, a first entity used for transmitting a protocol data unit (PDU) of the PDCP layer; and S120: sending the PDU to a network device via the first entity.

Specifically, the terminal device determines, when the data duplication function of the PDCP layer is switched from the activated state to the inactivated state, the first entity used for transmitting the PDU of the PDCP layer, and sends the PDU to the network device via the first entity.

That is, the RLC entity determined by the terminal device is configured to send the PDU to the network device. In other words, the first entity determined by the terminal device may be an RLC entity mapped onto a certain LCG, or may be an RLC entity not mapped onto the LCG. However, it is to be noted that if the first entity determined by the terminal device is the RLC entity not mapped onto the LCG, the terminal device needs to wait, before transmitting the PDU of the PDCP layer, until the network device successfully maps the first entity onto the LCG.

Referring to FIG. 1, it is assumed that when the data duplication function of the PDCP layer is in the activated state, the network device maps an RLC entity a onto a certain LCG, but does not map an RLC entity b onto the LCG. For example, if the terminal device selects the RLC entity a as the first entity, the terminal device may directly send the PDU of the PDCP layer to the network device via the RLC entity a. For another example, if the terminal device selects the RLC entity b as the first entity, the terminal device needs to wait until the network device maps the RLC entity b onto a certain LCG, and then sends the PDU of the PDCP layer to the network device via the RLC entity b.

As can be seen from the above analysis, in some embodiments of the present disclosure, the terminal device can determine an RLC entity (an RLC entity mapped onto an LCG or an RLC entity needing to be mapped onto the LCG) of a PDU for transmitting a PDCP layer when a data duplication function of the PDCP layer is switched from an activated state to an inactivated state, and then transmit the PDU of the PDCP layer on the RLC entity mapped onto the LCG, such that the success rate of data transmission can be effectively improved.

As an embodiment, the terminal device may acquire at least one second entity, which is an RLC entity corresponding to the PDU when the data duplication function is in the activated state, and then determine, in the at least one second entity, the first entity.

In other words, in some embodiments of the present disclosure, the terminal device may acquire the at least one second entity, which may include a third entity and a fourth entity, wherein the third entity may be an RLC entity corresponding to the PDU of the PDCP layer when the data duplication function is in the activated state, and the fourth entity may be an RLC entity corresponding to duplicated data of the PDU of the PDCP layer when the data duplication function is in the activated state. The third entity in the embodiment of the present disclosure is an RLC entity (logical channel) for transmitting the PDU of the PDCP layer, and the fourth entity is an RLC entity (logical channel) for transmitting duplicated data of the PDU of the PDCP layer. Referring to FIG. 1, the third entity is the RLC entity a, and the fourth entity is the RLC entity b.

For example, the terminal device may determine, in the at least one second entity, the RLC entity mapped onto the logical channel group (LCG) as the first entity. It is to be understood that in the embodiments of the present disclosure, the terminal device may directly select a PDU of the PDCP layer transmitted on the RLC entity mapped onto an LCG, which can effectively improve the success rate of data transmission.

For another example, the terminal device may determine the first entity according to a first order, wherein the first order is an arrangement order of the at least one second entity. It is to be understood that the first order may be indicated by the network device to the terminal device, or may be stored in the memory of the terminal device in a pre-configured manner, or may be stipulated in a protocol, and may also be determined through negotiation between the network device and the terminal device. However, the embodiments of the present disclosure are not specifically limited thereto.

By way of example but not limitation, the first order is a sequence formed by sorting the at least one second entity from high to low according to a priority of a logical channel corresponding to the RLC entity. The first order is stipulated in a protocol or is pre-configured in the network device and the terminal device.

In some embodiments of the present disclosure, the terminal device can determine an RLC entity mapped onto an LCG when the data duplication function of the PDCP layer is switched from the activated state to the inactivated state, and can transmit the PDU of the PDCP layer on the RLC entity mapped onto the LCG after the network device finishes the mapping operation, such that the success rate of data transmission can be effectively improved.

It is to be understood that in the embodiments of the present disclosure, when the terminal device determines the RLC entity mapped onto the logical channel group (LCG) as the first entity, if only one RLC entity among the at least one second entity has been mapped onto the LCG, the terminal device may select this RLC entity that has been mapped onto the LCG as the first entity. If a plurality of RLC entities among the at least one second entity are mapped onto the LCG, the terminal device may randomly select one or more RLC entities that have been mapped onto the LCG as the first entity.

As another embodiment, the terminal device may determine the first entity by way of network configuration. Optionally, the terminal device may receive the indication information sent by the network device, wherein the indication information is used for indicating the first entity. The terminal device determines the first entity according to the indication information sent by the network device. For example, the terminal device may receive a radio resource control (RRC) signaling sent by the network device, wherein the RRC signaling includes the indication information.

That is, the network device may generate indication information, wherein the indication information is used for indicating the terminal device to send, when the data duplication function of a packet data convergence protocol (PDCP) layer is switched from an activated state to an inactivated state, a protocol data unit (PDU) of the PDCP layer to the network device via a first entity. Next, the network device sends the indication information to the terminal device. Likewise, the network device may send a radio resource control (RRC) signaling to the terminal device, wherein the RRC signaling includes the indication information.

Figure 3:
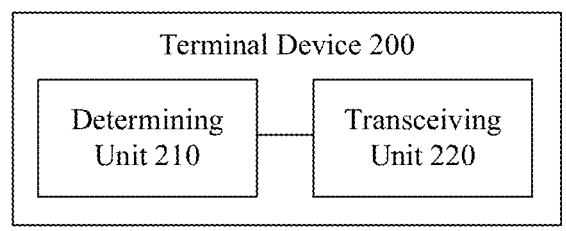
FIG. 3 is a schematic block diagram of a terminal device according to an embodiment of the present disclosure.

FIG. 3 is a schematic block diagram of a terminal device 200 according to an embodiment of the present disclosure.

As shown in FIG. 3, the terminal device 200 includes:

a determining unit 210, configured to determine, when a data duplication function of a packet data convergence protocol (PDCP) layer is switched from an activated state to an inactivated state, a first entity used for transmitting a protocol data unit (PDU) of the PDCP layer; and a transceiving unit 220, configured to send the PDU to a network device via the first entity.

Optionally, the determining unit 210 is specifically configured to:

acquire at least one second entity, the at least one second entity being a radio link control (RLC) entity corresponding to the PDU when the data duplication function is in the activated state; and determine the first entity in the at least one second entity.

Optionally, the determining unit 210 is specifically configured to:

determine, in the at least one second entity, the RLC entity mapped onto a logical channel group (LCG) as the first entity.

Optionally, the determining unit 210 is specifically configured to:

determine the first entity according to a first order, wherein the first order is an arrangement order of the at least one second entity.

Optionally, the first order is a sequence formed by sorting the at least one second entity from high to low according to a priority of a logical channel corresponding to the RLC entity.

Optionally, the determining unit 210 is specifically configured to:

determine the first entity according to indication information sent by the network device, the indication information being used for indicating the first entity.

Optionally, the transceiving unit 220 is also configured to:

receive the indication information sent by the network device before determining the first entity according to the indication information sent by the network device.

Optionally, the transceiving unit 220 is specifically configured to:

receive a radio resource control (RRC) signaling sent by the network device, the RRC signaling including the indication information.

Figure 4:
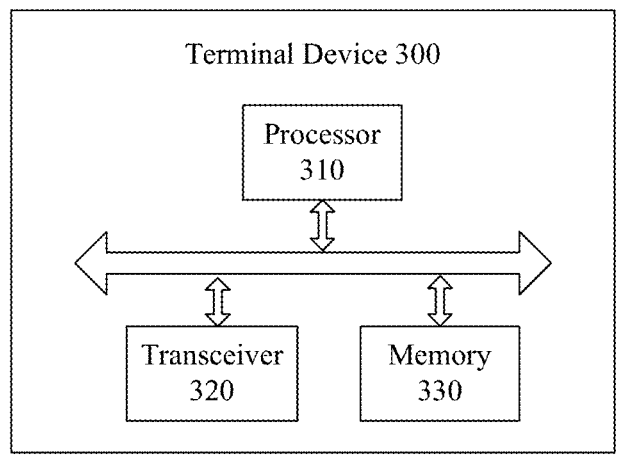
FIG. 4 is another schematic block diagram of a terminal device according to an embodiment of the present disclosure.

It is to be noted that in the embodiments of the present disclosure, the determining unit 210 may be implemented by a processor, and the transceiving unit 220 may be implemented by a transceiver. As shown in FIG. 4, the terminal device 300 may include a processor 310, a transceiver 320, and a memory 330. The memory 330 may be configured to store indication information and also may be configured to store a code or an instruction executed by the processor 310, etc. Each component of the terminal device 300 is coupled through a bus system, wherein the bus system includes a data bus, and further includes a power bus, a control bus, and a status signal bus.

The terminal device 300 as shown in FIG. 4 can implement procedures implemented by the terminal device in the foregoing method embodiments in FIG. 1 and FIG. 2, and thus their detailed descriptions are omitted herein to avoid repetitions.

Figure 5:
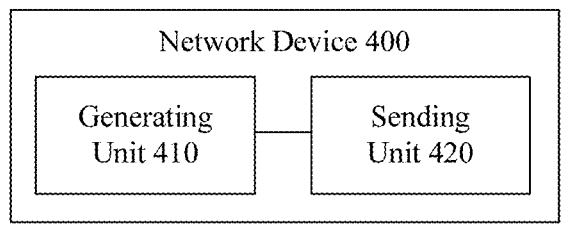
FIG. 5 is a schematic block diagram of a network device according to an embodiment of the present disclosure.

FIG. 5 is a schematic block diagram of a network device 400 according to an embodiment of the present disclosure.

As shown in FIG. 5, the network device 400 includes:

a generating unit 410, configured to generate indication information, the indication information being used for indicating a terminal device to send, when a data duplication function of a packet data convergence protocol (PDCP) layer is switched from an activated state to an inactivated state, a protocol data unit (PDU) of the PDCP layer to the network device via a first entity; and a sending unit 420, configured to send the indication information to the terminal device.

Optionally, the sending unit 420 is specifically configured to:

send a radio resource control (RRC) signaling to the terminal device, the RRC signaling including the indication information.

Figure 6:
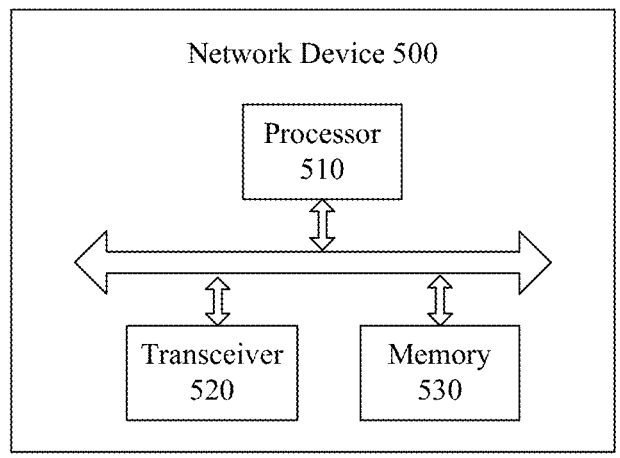
FIG. 6 is another schematic block diagram of a network device according to an embodiment of the present disclosure.

It is to be noted that in the embodiments of the present disclosure, the generating unit 410 may be implemented by a processor, and the sending unit 420 may be implemented by a transceiver. As shown in FIG. 6, the network device 500 may include a processor 510, a transceiver 520, and a memory 530. The memory 530 may be configured to store indication information and also may be configured to store a code or an instruction executed by the processor 510, etc. Each component of the network device 500 is coupled through a bus system, wherein the bus system includes a data bus, and further includes a power bus, a control bus, and a status signal bus.

The network device 500 as shown in FIG. 6 can implement procedures implemented by the network device in the foregoing method embodiments in FIG. 1 and FIG. 2, and thus their detailed descriptions are omitted herein to avoid repetitions.

It is to be noted that the method embodiments in the embodiments of the present disclosure may be applied to a processor, or may be implemented by the processor. The processor may be an integrated circuit chip and has a signal processing capability. In an implementation process, steps of the foregoing method embodiments may be implemented by using an integrated logic circuit of hardware in the processor or an instruction in a software form. The foregoing processor may be a general-purpose processor, a digital signal processor (DSP), an application-specific integrated circuit (ASIC), a field programmable gate array (FPGA) or another programmable logic device, a transistor logic device, or a discrete hardware component. The methods, steps, and logical block diagrams disclosed in the embodiments of the present disclosure may be implemented or executed. The general-purpose processor may be a microprocessor, or the processor may be any conventional processor or the like. The steps of the methods disclosed in the embodiments of the present disclosure may be directly executed by a hardware decoding processor, or may be executed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and implements the steps of the foregoing methods in combination with the hardware of the processor.

It can be understood that the memory in the embodiments of the present disclosure may be a volatile memory or a non-volatile memory, or may include both of a volatile memory and a non-volatile memory. The non-volatile memory may include: a read-only memory (ROM), a programmable ROM (PROM), an erasable PROM (EPROM), an electrically EPROM (EEPROM), or a flash memory. The volatile memory may be a random access memory (RAM), which is used as an external cache. According to description that can be used as an example but imposes no limitation, RAMs of many forms are applicable, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). It is to be noted that the memory in the system and the method described in this specification intends to include, but is not limited to, these memories and any other memory of a suitable type.

Finally, it is to be noted that terms used in the embodiments of the present disclosure and appended claims are only for the purpose of description of specific embodiments, and are not intended to limit the embodiments of the present disclosure.

For example, as used in the embodiments of the present disclosure and appended claims, the singular forms "a/an", "said" and "the" intend to also include the plural form, unless the content clearly dictates otherwise.

For another example, terms the first-type cell group and the second-type cell group may likely be used in the embodiments of the present disclosure, but these types of cell groups should not limited to these terms. These terms are only intended to distinguish among type cell groups.

For still another example, depending on the context, term "when" used herein can be interpreted as "if", "when", or "in response to determining" or "in response to detecting". Similarly, depending on the context, phrases "if determining" or "if detecting (stated condition or event)" can be interpreted as "when determining" or "in response to determining" or "when detecting (stated condition or event)" or "in response to detecting (stated condition or event)".

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the embodiments of the present disclosure.

Persons skilled in the art may clearly understand that for a convenient and concise description, a concrete work process of systems, apparatuses and units described above may refer to a corresponding process of the foregoing method embodiments, which is not repeated anymore herein.

From several embodiments provided in the application, it should be understood that the disclosed systems, apparatuses and methods may be implemented by means of other manners. For example, the apparatus embodiments described above are merely exemplary. For example, a unit partition is merely a logic functional partition. In actual implementation, additional manners of partitioning may be available. For another example, multiple units or components may be combined or integrated into another system, or some features may be ignored or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, i.e., either located at one place or distributed on a plurality of network units. Units may be selected in part or in whole according to actual needs to implement the objectives of the embodiments of the present disclosure.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solution of the embodiments of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of steps of the method as recited in the embodiments of the present disclosure. The aforementioned storage medium includes: a USB flash disk, a mobile hard disk, a read only memory (ROM), a random access memory (RAM), a magnetic disk or an optical disk and other media capable of storing program codes.

The abovementioned embodiments are merely specific embodiments of the present disclosure, but the protection scope of the embodiments of the present disclosure is not limited thereto. Any variation or substitution easily conceivable to a person of ordinary skills in the art within the technical scope disclosed in the present disclosure shall fall into the protection scope of the embodiments of the present disclosure. Therefore, the protection scope of the embodiments of the present disclosure shall be subject to that of the claims.

What is claimed is:

1. A data transmission method, comprising:
   determining, when a data duplication function of a packet data convergence protocol (PDCP) layer is switched from an activated state to an inactivated state, a first entity used for transmitting a protocol data unit (PDU) of the PDCP layer; and
   sending the PDU to a network device via the first entity;
   wherein the determining the first entity used for transmitting the PDU of the PDCP layer comprises:
      acquiring at least one second entity, the at least one second entity being a radio link control (RLC) entity corresponding to the PDU when the data duplication function is in the activated state; and
      determining the first entity from the at least one second entity;
   wherein the determining the first entity from the at least one second entity comprises:
      determining the first entity according to a first order, wherein the first order is an arrangement order of the at least one second entity and is a sequence formed by sorting the at least one second entity according to a priority of a logical channel corresponding to the RLC entity.

2. The method according to claim 1, wherein the determining the first entity from the at least one second entity further comprises:
   determining, in the at least one second entity, a RLC entity mapped onto a logical channel group (LCG) as the first entity.

3. The method according to claim 1, wherein the determining a first entity used for transmitting a protocol data unit (PDU) of the PDCP layer comprises:
   determining the first entity according to indication information sent by the network device.

4. The method according to claim 3, further comprising:
   receiving the indication information sent by the network device, the indication information being used for indicating the first entity.

5. The method according to claim 4, wherein the receiving the indication information sent by the network device comprises:
   receiving a radio resource control (RRC) signaling sent by the network device, the RRC signaling including the indication information.

6. A terminal device, comprising:
   a processor, configured to determine, when a data duplication function of a packet data convergence protocol (PDCP) layer is switched from an activated state to an inactivated state, a first entity used for transmitting a protocol data unit (PDU) of the PDCP layer; and
   a transceiver, configured to send the PDU to a network device via the first entity;
   wherein the processor is configured to:
      acquire at least one second entity, the at least one second entity being a radio link control (RLC) entity corresponding to the PDU when the data duplication function is in the activated state; and
      determine the first entity from the at least one second entity according to a first order, wherein the first order is an arrangement order of the at least one second entity and is a sequence formed by sorting the at least one second entity according to a priority of a logical channel corresponding to the RLC entity.

7. The terminal device according to claim 6, wherein the processor is further configured to:
   determine, in the at least one second entity, a RLC entity mapped onto a logical channel group (LCG) as the first entity.

8. The terminal device according to claim 6, wherein the processor is configured to:
   determine the first entity according to indication information sent by the network device.

9. The terminal device according to claim 8, wherein the transceiver is further configured to:
  receive the indication information sent by the network device, the indication information being used for indicating the first entity.

10. The terminal device according to claim 9, wherein the transceiver is configured to:
  receive a radio resource control (RRC) signaling sent by the network device, the RRC signaling including the indication information.

* * * * *